US006837510B1

(12) United States Patent  
Karls

(10) Patent No.: US 6,837,510 B1  
(45) Date of Patent: Jan. 4, 2005

(54) PINBALL HITCH

(76) Inventor: James L. Karls, 6551 65th St., NE., Sauk Rapids, Benton County, MN (US) 56379

( * ) Notice: Subject to any disclaimer, the term of this patent is extended or adjusted under 35 U.S.C. 154(b) by 0 days.

(21) Appl. No.: 10/401,434

(22) Filed: Mar. 28, 2003

Related U.S. Application Data

(60) Provisional application No. 60/414,613, filed on Sep. 27, 2002.

(51) Int. Cl.[7] ................................................ B60D 1/00
(52) U.S. Cl. ................. 280/416.1; 280/461.1; 280/456.1; 280/515; D12/162
(58) Field of Search .................... 280/416.1, 511, 280/497, 461.1, 456.1, 515, 504, 495, 490.1; D12/162

(56) References Cited

U.S. PATENT DOCUMENTS

| | | | | |
|---|---|---|---|---|
| 2,812,956 A | | 11/1957 | Edinger | |
| 2,827,307 A | | 3/1958 | Osborn | |
| 2,843,160 A | * | 7/1958 | Blashill | ...................... 140/92.3 |
| 3,326,576 A | | 6/1967 | Kothmann | |
| 3,393,924 A | * | 7/1968 | Silver | ...................... 280/461.1 |
| 3,700,263 A | | 10/1972 | Day | |
| 3,801,134 A | * | 4/1974 | Dees | ...................... 280/416.1 |
| 3,922,006 A | | 11/1975 | Borges | |
| 3,951,434 A | | 4/1976 | Sause | |
| 3,963,264 A | * | 6/1976 | Down | ...................... 280/416.1 |
| 4,022,490 A | | 5/1977 | Rocksvold | |
| 4,275,899 A | * | 6/1981 | Humphrey | ............... 280/491.3 |
| 4,280,713 A | * | 7/1981 | Bruhn | ...................... 280/416.1 |
| D276,602 S | * | 12/1984 | Dixon-Bate | ................ D12/162 |
| 4,729,571 A | | 3/1988 | Tienstra | |
| 5,265,899 A | * | 11/1993 | Harrison | .................. 280/416.1 |
| 5,839,744 A | * | 11/1998 | Marks | ...................... 280/416.1 |
| 6,129,371 A | * | 10/2000 | Powell | ..................... 280/461.1 |
| 6,386,573 B1 | * | 5/2002 | Solomon | ..................... 280/504 |

* cited by examiner

Primary Examiner—Lesley D. Morris  
Assistant Examiner—Tony Winner  
(74) Attorney, Agent, or Firm—Albert W. Watkins

(57) ABSTRACT

A hitch couples alternatively through either a ball or an implement pin. The implement pin is provided at a first elevation which is substantially below the ball coupling, which preserves optimum coupling heights for the different nature of towed vehicles. The pin coupling is shifted longitudinally relative to the ball sufficiently to prevent any vertical interference between the pin and the ball member above the pin. A sloped member between ball and pin coupling members provides interconnection therebetween. The sloped member is further coupled to a male receiver insert adapted to couple with a vehicle female receiver or other similar or alternative vehicular component capable of supporting the hitch.

9 Claims, 2 Drawing Sheets

PINBALL HITCH

CROSS REFERENCE TO RELATED APPLICATIONS

This application claims priority to U.S. provisional application Ser. No. 60/414,613 filed Sep. 27, 2002 and co-pending herewith.

BACKGROUND OF THE INVENTION

1. Field of the Invention

The present invention pertains generally to land vehicles, and more particularly to articulated vehicles that incorporate both a ball coupling and a draft pin coupling in a single unitary hitch.

2. Description of the Related Art

Multi-purpose trailer hitches have been desired for many years, particularly in the agricultural field. This is a direct consequence of the prevalence of multi-purpose vehicles, including for example but not limited to such vehicles as pick-up trucks, tractors and all-terrain vehicles. These machines have gained wide acceptance in the field of agriculture, since a single vehicle may provide both human transport and the movement of one or more very diverse loads. As a more detailed but not limiting example, a person may use a pick-up truck to travel over a roadway to a remote field or the like, whether the roadway is paved or otherwise. The pick-up will be generally preferred for this activity, owing to the comfort of the driver and any passengers, and also owing to the design for relative speed and safety for this type of travel. Once at the remote field location, the person may then discover the need to move a trailer or the like. As an example, feeder trailers are in common use which may have been emptied unexpectedly or which may require movement for other unexpected reasons. Rather than returning to the remote vehicle storage area and returning with a tractor, which is much more specifically designed for the moving of implements and agricultural trailers, the person would much prefer to directly couple the trailer to pick-up truck. Such multi-purpose utility, which is particularly desirable in the field of agriculture but which is required in other industries as well, provides substantial savings of both time and expense. Consequently, there has long been a demand for devices which permit the coupling of various devices to a motorized land vehicle.

Over-the-road trailers, such as but not limited to boat, camper and standard utility trailers., almost universally require a ball for connection to the trailer. In contrast, most agricultural trailers and implements, including but not limited to harrows, planters, spreaders and agricultural wagons, rely upon a pin-type hitch. Consequently, for a towing vehicle to be useful to tow a wide variety of towed vehicles, the towing vehicle must couple through both the ball and pin couplings.

Several patents are exemplary of hitches which provide the broader capability of diverse couplings. Illustrative are U.S. Pat. No. 2,827,307 by Osborn; U.S. Pat. No. 3,801,134 to Dees; U.S. Pat. No. 3,922,006 by Borges; 4,022,490 by Rocksvold; and U.S. Pat. No. 4,729,571 by Tienstra. These patents illustrate various pivotal couplings which, through the pivotal motion, exchange one type of hitch connector for another. Unfortunately, while these pivotal couplings offer extremely flexible coupling through a wide variety of couplers, several limitations have prevented these couplers from becoming the primary hitch of choice. The first limitation is derived directly from the components that permit mechanical motion. For example, in the Osborn patent a set of bolts may be provided which are removed or which may be loosened to permit the necessary pivoting between attachment support and vehicular attachment. This connection suffers very large force concentration during use when the two components are not tightly attached, since the play introduced by the ability to pivot also is associated with physical hammering upon the variation of travel between towing and towed vehicle, such as occurs when a pothole or the like is encountered by either vehicle. This substantial force requires the use of much more expensive components, and may still lead to early fatigue or stress induced cracking. The consequence of early fatigue or failure may be quite serious, and so designs reduce the likelihood of such an event occurring are generally preferred. When the components are instead tightly attached together, the forces are better transmitted without stress and force concentrations, but the desired pivotal motion between components is prevented, and time-consuming and difficult disassembly is required to adapt the hitch from one type of coupler to another. In other words, the very convenience which was intended is lost. Another disadvantage to these types of trailer hitches is the simple economic disadvantage. The construction of these types of hitches requires a number of relatively expensive components, making them economically less desirable.

A more common arrangement of components is illustrated by Edinger in U.S. Pat. No. 3,812,956. In this design, several holes are provided which permit one or more type of coupling to be available. In particular, an implement pin may be used to pass through a hole, or may alternatively placed in a nearby hole for storage. When required, the ball and implement pin may be exchanged, thereby permitting the vehicle operator to exchange one coupling for another. Unfortunately, in this arrangement both the agricultural implement and a ball and socket connections are at a single elevation, which is not the correct elevation for these different types of trailers. Furthermore, the requirement for the removal of the ball from the hole to rearrange once again means the use of substantial tools or the risk of lost or failed coupling, since a ball is normally very tightly bolted in the hole to prevent the motion relative to the hole and associated stress concentrations and fatiguing that were discussed herein above.

Day, in U.S. Pat. No. 3,700,263, illustrates a coupler similar to Edinger, where a first hold may be provided for a ball, and a second hole is provided which may either house a ball or a pin. The first ball connection is elevated sufficiently to just clear the second hole. No attempt is made to provide proper elevation, nor is there nay way to readily store an associated pin while using the ball illustrated therein. What is desired then is a coupler which overcomes the limitations of the prior art by incorporating such desirable features as a low manufactured cost and high field reliability, and which provides optimum coupling for both pin and also ball couplings.

SUMMARY OF THE INVENTION

In a first manifestation, the invention is a hitch forming an articulated joint between a towed vehicle and a towing vehicle at an elevation preferred for a particular coupling type. A towing vehicle connector is adapted to operatively retain the hitch to towing vehicle. A member slopes at an angle between vertical and horizontal and has a first end and a second end and a connection to the towing vehicle connector between first and second ends. A bottom generally horizontal and relatively planar surface has a pin hole passing therethrough adapted to receive an implement pin therein. A top generally horizontal and relatively planar surface has a ball hole passing therethrough adapted to receive a trailer ball therein. The sloped member extends from the bottom generally horizontal and relatively planar surface to the top generally horizontal and relatively planar surface and is unitary therewith to form a generally unshaped strap.

In a second manifestation, the invention is an apparatus for forming articulated connections between a towing vehicle and a towed vehicle by selectively using a single one of at least two diverse connectors to connect to the towed vehicle. A first surface supports a first one of the at least two diverse connectors. A second surface supports a second one of the at least two diverse connectors. A spacer between the first and second surfaces vertically offsets the first surface from the second surface by an elevation sufficient for a towed vehicle coupled to the first one of the at least two diverse connectors to safely clear the second one of the at least two diverse connectors during operational movement between towing vehicle and towed vehicle, and horizontally offsets the first surface from the second surface in a direction which locates the first one of the at least two diverse connectors more closely adjacent to the towing vehicle than the second one of the at least two diverse connectors and horizontally offsets the first surface from the second one of the at least two diverse connectors by an amount sufficient to avoid interference between first surface and second one of the at least two diverse connectors when the second one of said at least two diverse connectors is vertically removed from the second surface. A coupling member operatively couples to the towing vehicle and supports the first surface, second surface and spacer therefrom.

In a third manifestation, the invention is a hitch operatively attachable to a towing vehicle which has first and second alternative couplers for coupling to different styles of towed vehicle couplers. The towed vehicle couplers are longitudinally displaced from the towing vehicle when the hitch is operative attached to the towing vehicle and coupled to the towed vehicle coupler. The hitch consists essentially of a first longitudinally extensive member operatively engagable with the towing vehicle and operatively supporting the hitch therefrom when operatively engaged; a second longitudinally extensive member supporting a ball therefrom, the ball operatively engageable with ball-type towed vehicle couplers; a third longitudinally extensive member supporting a pin therefrom, the pin operatively engageable with pin-type towed vehicle couplers; and an interconnecting member angled relative to the longitudinal axis and coupling the first, second and third longitudinally extensive members together and thereby longitudinally and transversely offsetting ball from pin, the interconnecting member sufficiently extensive between second and third longitudinally extensive members to enable use of either one of pin or ball to couple to the towed vehicle coupler without interference with the other of pin or ball during operation.

OBJECTS OF THE INVENTION

Exemplary embodiments of the present invention solve inadequacies of the prior art by providing a unitary supporting structure that locates a pin coupling at a first relative elevation and a second ball coupling at an elevation well above the pin coupling, where either coupling may be used without the risk of interference from the other coupling.

A first object of the invention is to provide both pin and ball-type couplings without the need for tools to switch between couplings. A second object of the invention is to provide a reliable and sturdy hitch which will survive substantial forces and stresses with a reduced probability of failure or stress-cracking. Another object of the present invention is to require a minimal additional manufacturing expense when compared with single coupling hitches. A further object of the invention is to provide a hitch having relatively self-evident arrangement of components, to reduce the risk of incorrectly installed or coupled components and towed vehicles. Yet another object of the invention is to support both pin and ball-type trailers at their respective ideal elevations. A still further object of the invention is to provide a dual component hitch with minimal longitudinal extension, thereby presenting less of an obstacle to a person moving adjacent the hitch.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Manifested in the preferred embodiment, the present invention provides a single receiver hitch which is readily manufactured, of durable construction, and which provides the proper attachment and elevation for both pin-type hitches and ball-type hitches. Several embodiments are illustrated which incorporate the teachings and features of the present invention in what are the most preferred forms. Nevertheless, other forms and embodiments will be discussed and will be inferred from the teachings herein.

Figure 1:
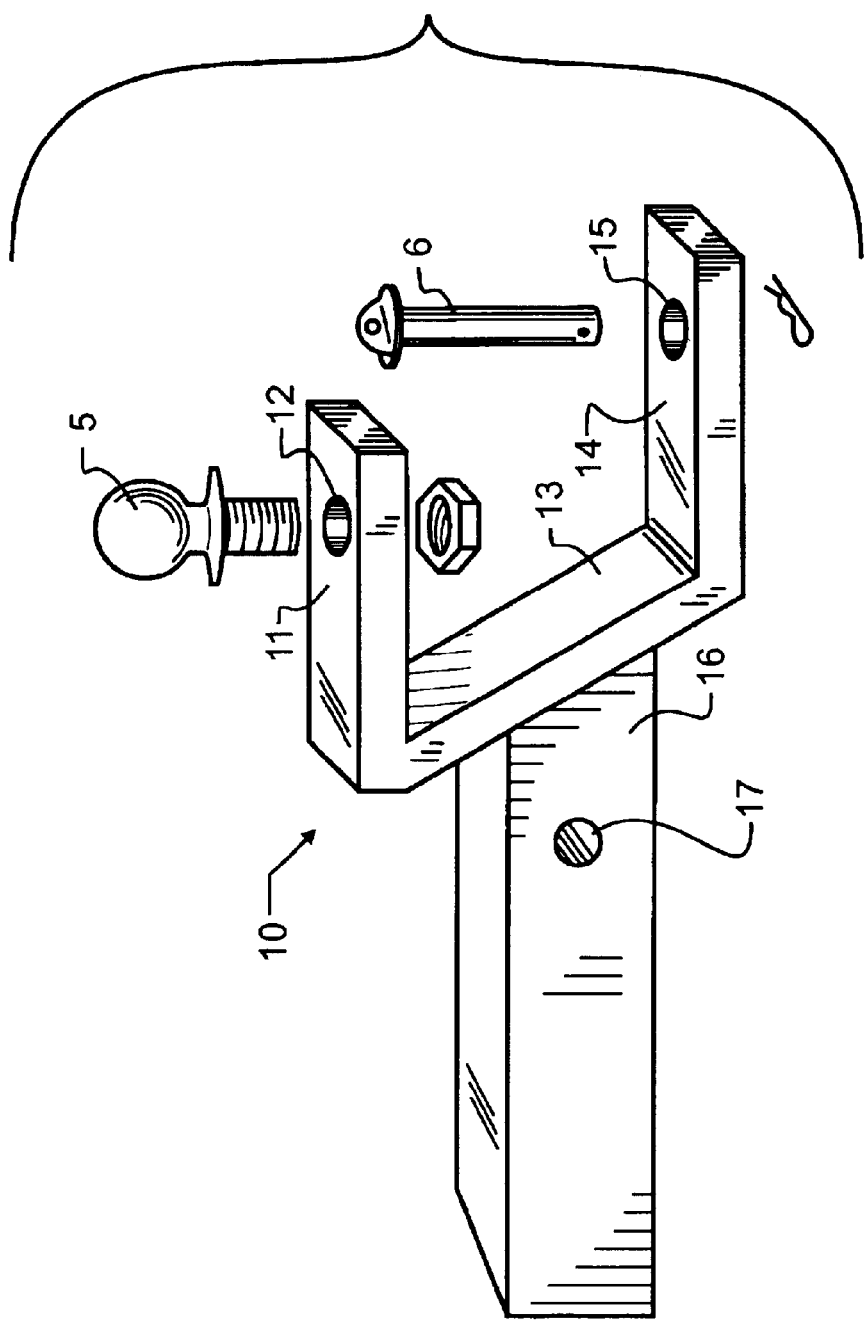
FIG. 1 illustrates a preferred embodiment of the invention from side projected plan view.

In a most preferred embodiment of the invention illustrated in FIG. 1, a hitch 10 is illustrated such as might be used with a pick-up truck, automobile hitch receiver, lawn and garden tractor, or others of a myriad of towing vehicles. Hitch receivers are well known, having recently gained almost universal acceptance, owing to their inherent flexibility coupling different components and carriers to a vehicle. These receivers are generally one and one-quarter inches square or two inches square, depending upon the load rating of the particular receiver. A pin running transverse to the longitudinal axis of the hitch receiver is typically provided, for retaining different components in the receiver.

In consideration of the standard hitch geometry and prevalence of automobiles, pickup trucks and other similar vehicles, the most preferred vehicle hitch 10 includes a square bar 16 having a hole 17 extending transverse, designed to align with the hole in a standard hitch receiver. Different types of connections may be provided other than for square tubular hitch receivers as is known in the art, though, owing to the wide availability, these are most preferable. Square bar 16 may be a solid bar, but will more typically be comprised by a relatively thick-walled tubular material, the choice which is well understood by those skilled in the art of hitch receivers.

As illustrated in FIG. 1, vehicle hitch 10 includes a top level 11 which includes a vertical hole 12. Hole 12 is dimensioned to permit a standard ball 5 to pass through. Ball 5 is of the type used typically for attachment to utility trailers, campers, and other typical over-the-road trailers. These balls come in several sizes, the particular size of which will be selected by the user, and which may be changed at will by the user. Most preferably, and as shown in FIG. 1, ball 5 will rest on a level slightly higher than the receiver hitch, as represented by square bar 16, and will be positioned relatively close to the receiver and towing vehicle. This is achieved through a generally vertically extending but sloped bar 13, which extends from a topmost position adjacent the vehicle to a lower position slightly farther away from the vehicle and receiver. Extending from the bottom of this vertically extending sloped bar 13 is a generally horizontal bar 14 which includes a hole 15 therein for a pin 6. Most preferably, pin hole 15 is designed to receive pins such as are commonly found and used on agricultural implements and wagons. The horizontal offset between ball 5 and pin 6, or, said another way, the displacement along the longitudinal axis of the towing vehicle, enables pin 6 to be inserted through pin hole 15 without interference from ball 5 or top level 11. In the most preferred embodiment hitch 10, the vertical axis of ball 5 is generally aligned with the junction between generally horizontal bar 14 and sloped bar 13, and the length of generally horizontal bar 14 is similar to or identical to that of top level 11.

The vertical offset provides a more desirable angle of attachment between towing vehicle and towed vehicle than has been found heretofore in the prior art. More particularly, many agricultural implements are designed to be attached at a level which is lower than over-the-road trailers. By providing the vertical offset between ball 5 and pin 6, this difference is accommodated.

The combination of vertical and horizontal offset of sloped bar 13 also provides benefit in attachment to square bar 16. The slope provides more bonding area, which in the case of the preferred embodiment is longer weld lines than would exist with either horizontal or vertical connection. Further, the forces during usage tend to be primarily vertical or horizontal in nature, and the angled slope provides less shear force in those instances. The sloped arrangement additionally minimizes the overall longitudinal length of hitch 10, which thereby presents less of an obstacle to persons and objects passing near to a towing vehicle.

While top level 11, sloped bar 13, and horizontal bar 14 could be manufactured from discrete components that are somehow joined together, in the most preferred embodiment as illustrated in FIG. 1 these components are formed from a single unitary metal bar, strap or plate, typically through a pressing operation to form the appropriate shape. The use of a unitary metal component ensures substantial strength, while reducing the risk of weld failures or the like. Furthermore, in quantity, the use of punch formed metal will often improve the quality of the finished product while reducing manufactured cost. Finally, as may be apparent, the preferred embodiment hitch 10 is manufactured from only two major components, bar 16 and the single unitary strap that was just described as forming top bar 11, sloped bar 13, and horizontal bar 14. The substantial reduction in required components is highly desirable in an old and competitive industry such as this.

Figure 2:
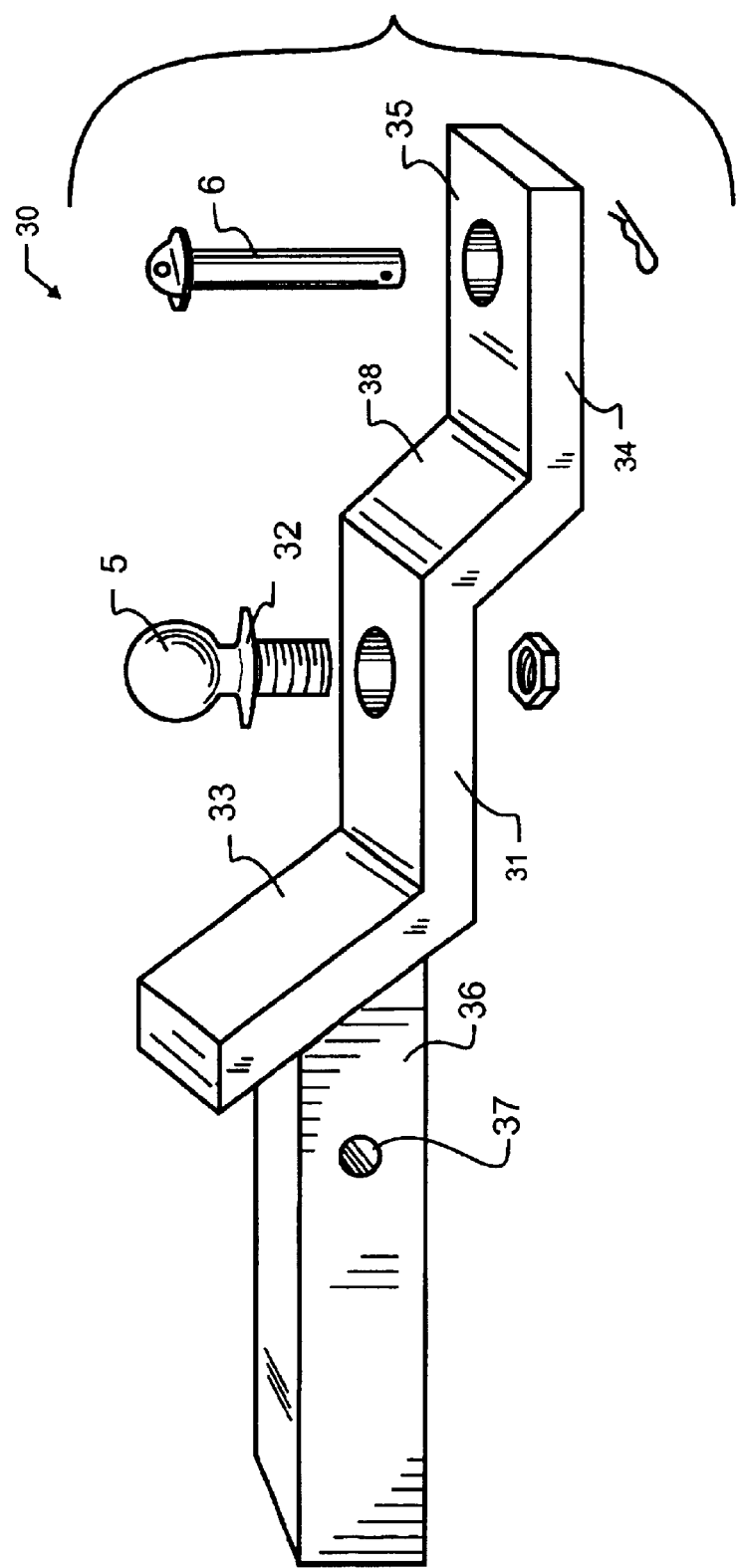
FIG. 2 illustrates a first alternative embodiment of the invention from side projected plan view.

FIG. 2 illustrates a first alternative embodiment hitch 30 designed in accord with the teachings of the invention and which incorporates some of the benefits and features of the preferred embodiment hitch 10, but which is adapted for use with a tractor or other relatively higher coupling point. As illustrated therein, a bar stock 36 having a hole 37 may be used to attach to the tractor. This type of connection may be designed to match the requirements of the specific tractor, as would be apparent to those familiar with agricultural equipment. Extending from bar 36 is a single rectangular bar stock that has been bent at several positions. The first sloped section 33 lowers to first level 31. Level 31 has a ball hole 32 for receiving a ball such as ball 5 shown in FIG. 1. Extending from first level 31 to a lower level 34 is sloped section 38, and a hole 35 is provided in this second lower level 34 for receiving a pin such as pin 6 shown in FIG. 1. This arrangement permits a ball such as ball 5 to be retained at a more nearly appropriate level, and similarly drops to the level appropriate for agricultural pin-type attachment without incurring interference therebetween. As with pinball hitch 10, pinball hitch 30 will provide the combination of appropriate elevation, lack of interference between hitch components, and, in the case of the illustrated embodiments, a very strong and reliable unitary construction.

From these figures, several additional design considerations should become more apparent. First of all, pinball hitches designed in accord with the teachings of the present invention may be manufactured from a variety of materials, including metals, resins and plastics, ceramics or other materials, or even combinations of the above. Metals, owing to cost, consistency, strength, ease of manufacture suing punch press techniques and other similarly effective techniques, history in the industry and the like, are most preferred and are well understood, though it should be apparent that those skilled in the field could conceive of different materials after review of the present disclosure. Various plating layers and coatings may also be used, provided the plating and coatings do not adversely affect the interaction between the hitch and receiver. These types of surface treatments, which may include chrome or zinc plating for exemplary purposes but not limited thereto, are normally applied to provide sufficient weather resistance to a lower cost or more malleable primary metal. Dimensions are not critical to the present invention, although relative sizes and proportions to attain the aforementioned features and benefits should be retained. For example, the application to one and one-quarter inch or two inch receivers is immaterial to the features of the invention, though the different sizes will require different dimensions and potentially different thicknesses and weights of metal used in the fabrication of the hitches, since the receivers are designed for differing loads.

A variety of designs have been contemplated herein. The materials used for a particular design may be chosen not only based upon the aforementioned factors such as weather resistance and weight, but may also factor in the particular design. Other variations are also contemplated herein with regard to alternative embodiments, including combinations of features and uses with other types of hitches.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims hereinbelow.

I claim:

1. A hitch forming an articulated joint between a towed vehicle and a towing vehicle at an elevation preferred for a particular coupling, comprising:

a towing vehicle connector adapted to operatively retain said hitch to said towing vehicle;

a member sloped at an angle less than vertical and more than horizontal and having a first end and a second end and a connection to said towing vehicle connector between said first and second ends;

a bottom generally horizontal surface with a pin hole passing therethrough adapted to receive an implement pin therein;

a top generally horizontal surface with a ball hole passing therethrough adapted to receive a trailer ball therein;

said sloped member extending from said bottom generally horizontal surface to said top generally horizontal surface and unitary therewith to form a generally u-shaped strap.

2. The hitch of claim 1 wherein said bottom generally horizontal surface and said top generally horizontal surface are relatively planar surfaces.

3. The hitch of claim 1 wherein said bottom generally horizontal surface and said top generally horizontal surface are horizontally offset by an amount sufficient to permit said implement pin to be retracted from said pin hole vertically past an end of said top generally horizontal surface.

4. The hitch of claim 1 wherein said ball hole is axially aligned with a junction between said bottom generally horizontal surface and said sloped member.

5. A hitch operatively attachable to a towing vehicle and having first and second alternative couplers for coupling to different styles of towed vehicle couplers, said towed vehicle couplers longitudinally displaced from said towing vehicle when said hitch is operatively attached to said towing vehicle and coupled to said towed vehicle coupler, consisting essentially of:

a first longitudinally extensive member operatively engagable with said towing vehicle and operatively supporting said hitch therefrom when operatively engaged;

a second longitudinally extensive member supporting a ball therefrom, said ball operatively engageable with towed vehicle ball couplers;

a third longitudinally extensive member supporting a pin therefrom, said pin operatively engageable with towed vehicle pin couplers; and an interconnecting member angled relative to a longitudinal axis of said first longitudinally extensive member and coupling said first, second and third longitudinally extensive members together and thereby longitudinally and transversely offsetting said ball from said pin, said interconnecting member sufficiently extensive between said second and third longitudinally extensive members to enable use of either one of said pin or said ball to couple to said towed vehicle coupler without interference with the other of said pin or said ball during operation.

6. The hitch of claim 5 wherein second longitudinally extensive member is vertically displaced above said third longitudinally extensive member.

7. The hitch of claim 5 wherein second and third longitudinally extensive members and said interconnecting member are unitary in construction.

8. The hitch of claim 5 wherein said first longitudinally extensive member couples directly to said interconnecting member.

9. The hitch of claim 7 wherein second and third longitudinally extensive members and said interconnecting member are generally rectangular in cross-section.

* * * * *